US008634385B2

(12) United States Patent
Papasakellariou et al.

(10) Patent No.: US 8,634,385 B2
(45) Date of Patent: Jan. 21, 2014

(54) METHOD AND APPARATUS FOR SUPPORTING MULTIPLE REFERENCE SIGNALS IN OFDMA COMMUNICATION SYSTEMS

(75) Inventors: Aris Papasakellariou, Houston, TX (US); Joon-Young Cho, Suwon-si (KR); Ju-Ho Lee, Suwon-si (KR); Jin-Kyu Han, Seoul (KR)

(73) Assignee: Samsung Electronics Co., Ltd. (KR)

( * ) Notice: Subject to any disclaimer, the term of this patent is extended or adjusted under 35 U.S.C. 154(b) by 742 days.

(21) Appl. No.: 12/541,475

(22) Filed: Aug. 14, 2009

(65) Prior Publication Data

US 2010/0039970 A1    Feb. 18, 2010

Related U.S. Application Data

(60) Provisional application No. 61/088,886, filed on Aug. 14, 2008.

(51) Int. Cl.
*H04W 4/00*    (2009.01)

(52) U.S. Cl.
USPC ............................ 370/334; 375/295; 375/299

(58) Field of Classification Search
USPC ......... 370/350, 503, 208, 210, 344, 347, 342, 370/498, 334, 328, 329, 260, 278; 375/260, 375/299, 295
See application file for complete search history.

(56) References Cited

U.S. PATENT DOCUMENTS

| | | | |
|---|---|---|---|
| 2008/0139237 A1 | 6/2008 | Papasakellariou | |
| 2009/0022235 A1* | 1/2009 | Zhang et al. | 375/260 |
| 2009/0252077 A1* | 10/2009 | Khandekar et al. | 370/312 |
| 2011/0070891 A1 | 3/2011 | Nishio et al. | |
| 2011/0116572 A1* | 5/2011 | Lee et al. | 375/295 |
| 2011/0134867 A1 | 6/2011 | Lee et al. | |

FOREIGN PATENT DOCUMENTS

| | | |
|---|---|---|
| JP | 2011-528887 | 11/2011 |
| WO | WO 2008/050964 | 5/2008 |
| WO | WO 2009/157167 | 12/2009 |
| WO | WO 2010/017628 | 2/2010 |

OTHER PUBLICATIONS

Motorola: "Common Reference Symbol Mapping/Signaling for 8 Transmit Antennas," R1-083224, 3GPP TSG Ran1 #54, Aug. 18, 2008.

(Continued)

*Primary Examiner* — Dady Chery
(74) *Attorney, Agent, or Firm* — The Farrell Law Firm, P.C.

(57) ABSTRACT

Methods and apparatuses are described for a Node B to transmit Reference Signals (RS) from multiple antennas to enable User Equipments (UEs) to perform demodulation of received information signals and to estimate Channel Quality Indication (CQI) metrics. To minimize overhead and enable backward compatible operation with legacy systems, RS from a first set of Node B antennas are transmitted in every transmission time interval and substantially over the whole operating BandWidth (BW). RS from a second set of Node B antennas serving for CQI estimation are periodically transmitted, substantially over the whole operating BW, with transmission period informed to UEs through broadcast signaling by the Node B and starting transmission sub-frame determined from the identity of the cell served by the Node B. RS from the second set of antennas, and new RS from the first set of antennas, serving for demodulation of information signals have substantially the same BW as the information signals which can be smaller than the operating BW.

21 Claims, 10 Drawing Sheets

(56) References Cited

OTHER PUBLICATIONS

Samsung: "Issues on DL RS Design for Higher Order MIMO," R1-084169, 3GPP TSG RAN WG1 #55, Nov. 10, 2008.

Nortel Networks: "RS Design Considerations for High-Order MIMO in LTE-A", R1-083157, TSG-RAN1 #54, Aug. 18, 2008.

NTT DoCoMo, "Support of DL Higher-Order MIMO Transmission in LTE-Advanced", R1-083685, 3GPP TSG RAN WG1 Meeting #54bis, Oct. 3, 2008.

* cited by examiner

METHOD AND APPARATUS FOR SUPPORTING MULTIPLE REFERENCE SIGNALS IN OFDMA COMMUNICATION SYSTEMS

PRIORITY

The present application claims priority under 35 U.S.C. §119(e) to U.S. Provisional Application No. 61/088,886, entitled "Support of Multiple Reference Signals in OFDMA Communication Systems", which was filed on Aug. 14, 2008, the contents of which are incorporated herein by reference.

BACKGROUND OF THE INVENTION

1. Field of the Invention

The present invention is directed to a wireless communication system and, more specifically, to an Orthogonal Frequency Division Multiple Access (OFDMA) communication system, in light of the development of the $3^{rd}$ Generation Partnership Project (3GPP) Evolved Universal Terrestrial Radio Access (E-UTRA) Long Term Evolution (LTE).

2. Description of the Art

A User Equipment (UE), also commonly referred to as a terminal or a mobile station, may be fixed or mobile and may be a wireless device, a cellular phone, a personal computer device, a wireless modem card, etc. A Node B (or base station) is generally a fixed station and may also be referred to as a Base Transceiver System (BTS), an access point, or some other terminology.

Several types of signals should be supported for the proper functionality of a communication system. The DownLink (DL) signals consist of data signals, control signals, and reference signals (also known as pilot signals). The data signals carry the information content and can be conveyed from the serving Node B to UEs through a Physical Downlink Shared CHannel (PDSCH). The control signals may be of broadcast or UE-specific. Broadcast control signals convey system information to all UEs. UE-specific control signals convey information related to the scheduling of data signal transmissions from the serving Node B to a UE or from a UE to the serving Node B. The signal transmissions from UEs to a serving Node B occur in the UpLink (UL) of the communication system. The transmission of UE-specific control signals from the serving Node B to UEs is assumed to be through a Physical Downlink Control CHannel (PDCCH).

The DL Reference Signals (RS) can serve for the UEs to perform multiple functions, as known in the art, such as: channel estimation in order to perform demodulation of data signals or control signals; phase reference for Multiple-Input Multiple Output (MIMO) or beam-forming reception; measurements assisting in a cell search and a handover; or Channel Quality Indication (CQI) measurements for link adaptation and channel-dependent scheduling.

The DL RS transmission can have certain characteristics including: time multiplexed (transmitted only during certain Orthogonal Frequency Division Multiplexing (OFDM) symbols); scattered (having a pattern in both the time and frequency domains); common (can be received by all UEs in a serving Node B); dedicated (can be received only by one or a few UEs in a serving Node B); or multiple antennas (in support of MIMO, beam-forming, or transmission (TX) diversity).

Figure 1:
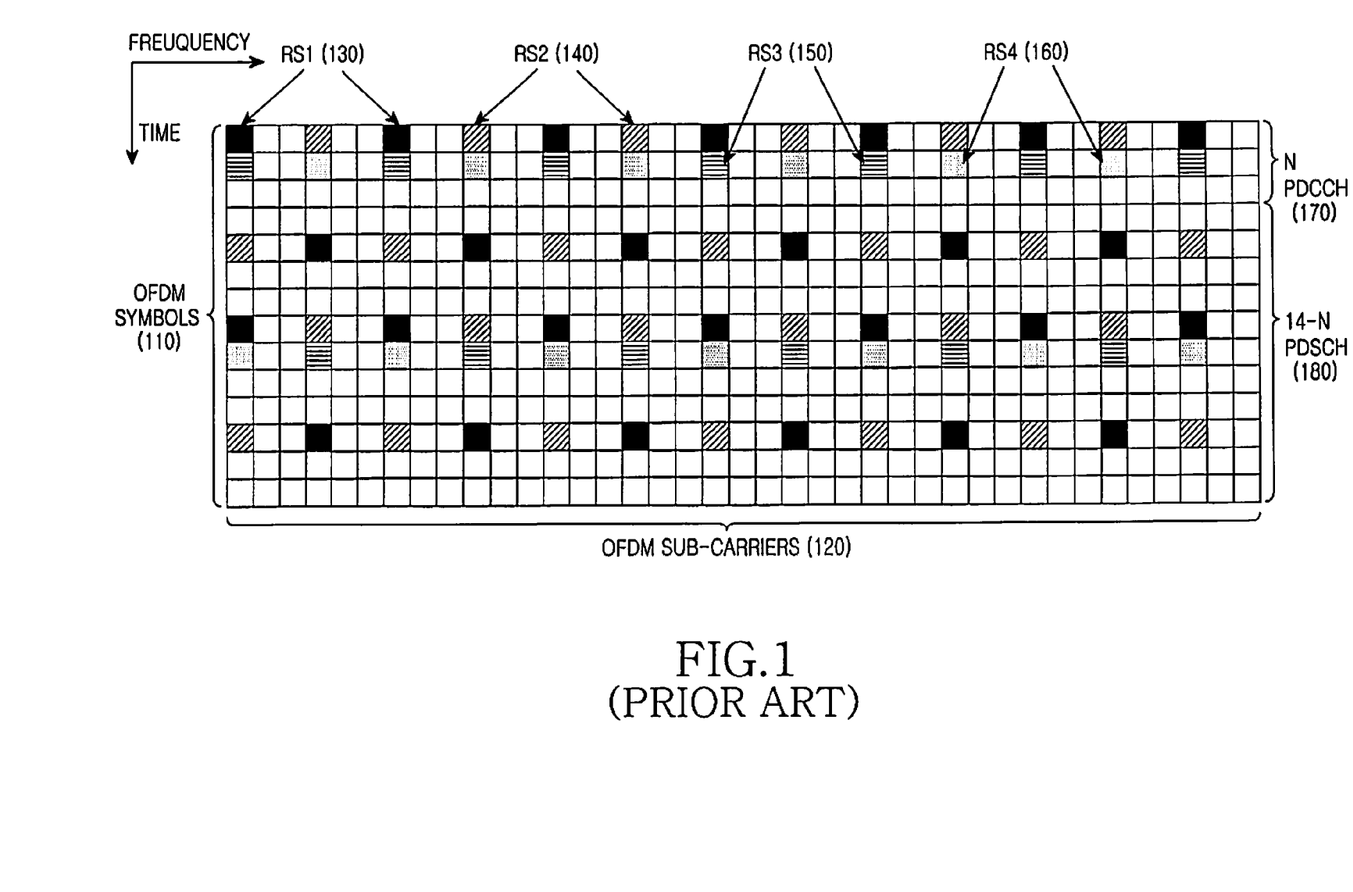
FIG. 1 is a diagram illustrating a downlink sub-frame structure for an OFDMA communication system.

An exemplary structure for a Common RS (CRS) transmitted from four antennas of a serving Node B is shown in FIG. 1. FIG. 1 corresponds to one of the structures used in the 3GPP E-UTRA LTE. The DL data packet transmission time unit is assumed to be a sub-frame comprising 14 OFDM symbols 110. Each OFDM symbol is transmitted over an operating BandWidth (BW) comprising OFDM sub-carriers 120 or Resource Elements (REs). Four Node B transmission antennas are assumed. The DL RS from antenna 1, antenna 2, antenna 3, and antenna 4 is respectively denoted as RS1 130, RS2 140, RS3 150, and RS4 160. Each RS has a scattered structure over the DL sub-frame. If only two Node B antennas exist, the corresponding sub-carriers occupied by the RS for Node B antennas 3 and 4 may be used for the transmission of control or data signals or simply left empty. The same applies for the sub-carriers occupied by the RS for antenna 2 if only one antenna exists. The time density of RS1 and RS2 is twice the time density of RS3 and RS4 as the frequency density is the same for all RSs. The former RSs exist in 4 OFDM symbols while the latter RSs exist in 2 OFDM symbols. The rationale for such a non-uniformity is that the use of the third and fourth antennas is typically associated with low to moderate UE velocities, such as, for example, up to 200 Kilometers per hour, and the time density of the respective RS can be decreased but remain adequate to capture the time variations of the channel medium for typical carrier frequencies while the corresponding RS overhead from Node B antennas 3 and 4 becomes half that from Node B antennas 1 and 2.

The RS structures illustrated in FIG. 1 correspond to the CRS which substantially occupies the entire operating BW as opposed to the UE-Dedicated RS (DRS) which typically occupies only the BW where a UE is scheduled to receive DL data packet reception in the PDSCH. This enables the CRS to be used for the reception of signals with frequency diverse transmission, such as, for example, control signals, for CQI measurements, or for cell search and handover measurements. However, if the RS is intended to be used only for providing a phase reference for beam-forming or MIMO, a DRS transmitted over the PDSCH data packet transmission BW to a UE suffices. In FIG. 1 for the PDCCH and PDSCH multiplexing, the PDCCH 170 occupies the first N OFDM symbols while the remaining 14-N OFDM symbols are typically assigned to PDSCH transmission 180 but may occasionally also contain transmission of synchronization and broadcast channels.

Figure 2:
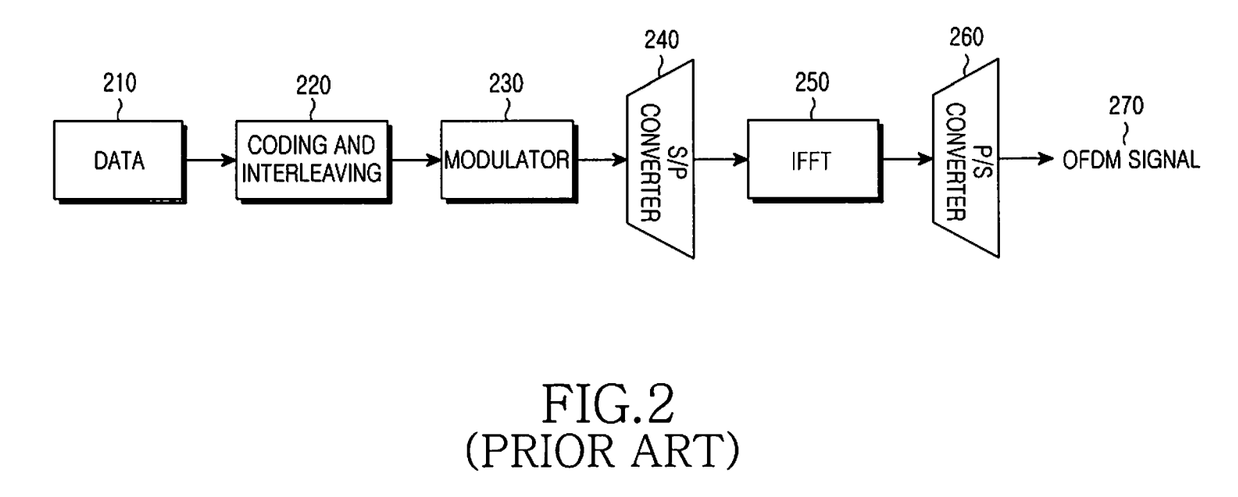
FIG. 2 is a block diagram illustrative of an OFDM transmitter.

An OFDM transmitter is illustrated in FIG. 2. The information data 210 is first encoded and interleaved by coding and interleaving unit 220, for example, using turbo encoding and block interleaving. The data is then modulated in modulator 230, for example, using QPSK, QAM16, or QAM64 modulation. A Serial to Parallel (S/P) conversion is applied to generate M modulation symbols in S/P converter 1:M 240 which are subsequently provided to an IFFT unit 250 which effectively produces a time superposition of M orthogonal narrowband sub-carriers. The M-point time domain blocks obtained from the IFFT unit 250 are then serialized Parallel to Serial (P/S) converted M:1 260 to create a time domain OFDM signal 270. The RS transmission can be viewed as a non-modulated data transmission. Additional functionalities, such as data scrambling, cyclic prefix insertion, time windowing, filtering, and others are well known in the art and are omitted for clarity.

Figure 3:
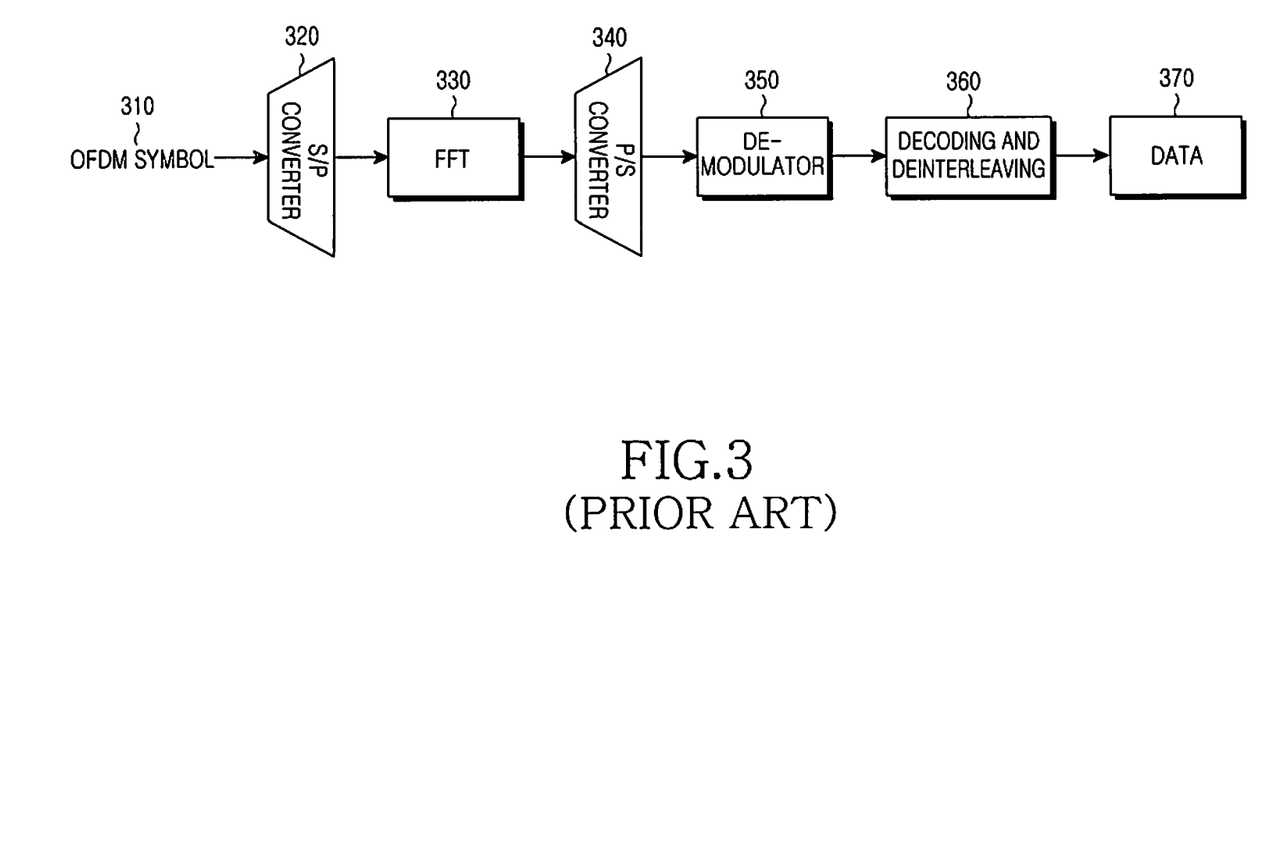
FIG. 3 is a block diagram illustrative of an OFDM receiver.

The reverse functions are performed at the OFDM receiver as illustrated in FIG. 3. The received OFDM signal 310 is provided to a serial to parallel converter 320 to generate M received signal samples which are then provided to an FFT unit 330, and after the output of the FFT unit 330 is serialized in P/S converter 340, the signal is provided to demodulator 350 and decoding and deinterleaving unit 360 to produce decoded data. Similarly to the OFDM transmitter structure in FIG. 2, well known in the art functionalities such as filtering, time-windowing, cyclic prefix removal, and de-scrambling are not shown for clarity. Also, receiver operations such as channel estimation using the RS are also omitted for clarity.

Figure 4:
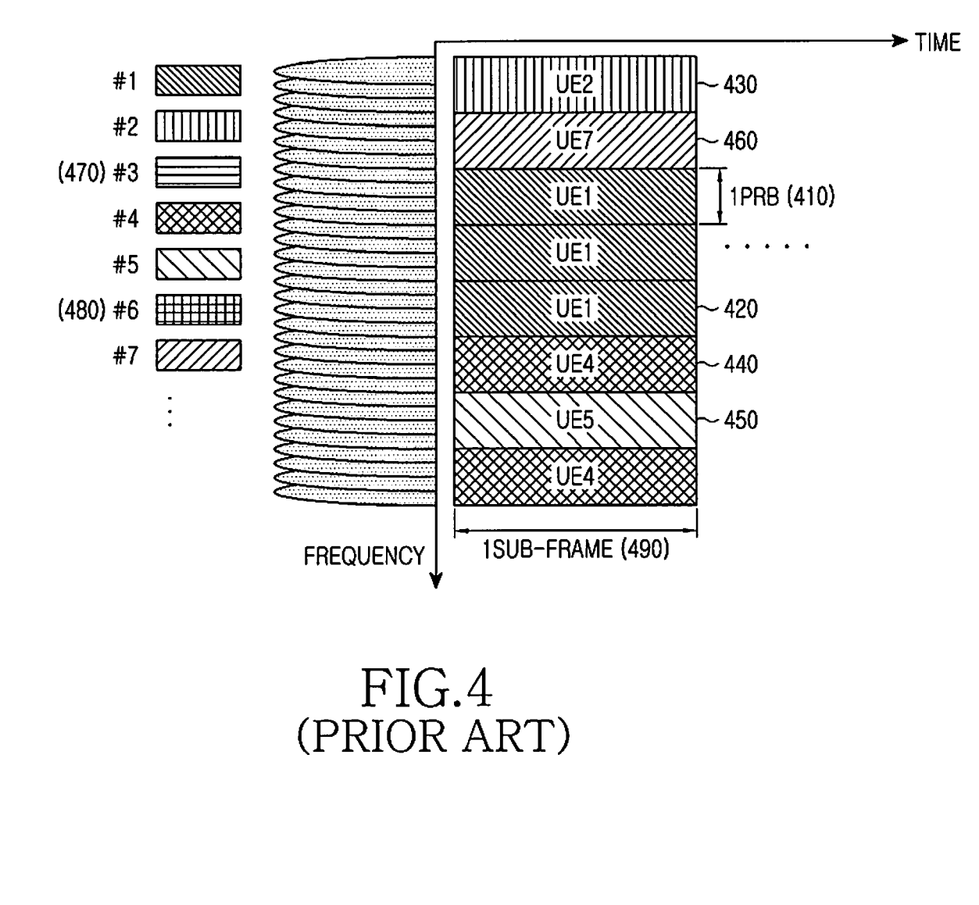
FIG. 4 is a diagram illustrative of scheduling data packet transmissions in an OFDMA communication system.

The total operating BW may consist of elementary scheduling units, referred to as Physical Resource Blocks (PRBs). For example, a PRB may consist of 12 consecutive sub-carriers. This allows the serving Node B to configure, through the PDCCH, multiple UEs to simultaneously transmit or receive data packets in the UL or DL by assigning different PRBs for the packet transmission or reception from or to each UE. For the DL, this concept is illustrated in FIG. 4 where five out of seven UEs are scheduled to receive data in one sub-frame over 8 PRBs 410. UE1 420, UE2 430, UE4 440, UE5 450, and UE7 460, are scheduled for PDSCH reception in one or more PRBs while UE3 470 and UE6 480 are not scheduled for any PDSCH reception during the reference sub-frame 490. The allocation of PRBs may or may not be contiguous in the frequency domain and a UE may be allocated an arbitrary number of PRBs (up to a maximum number as determined by the operating BW and the PRB size).

Figure 5:
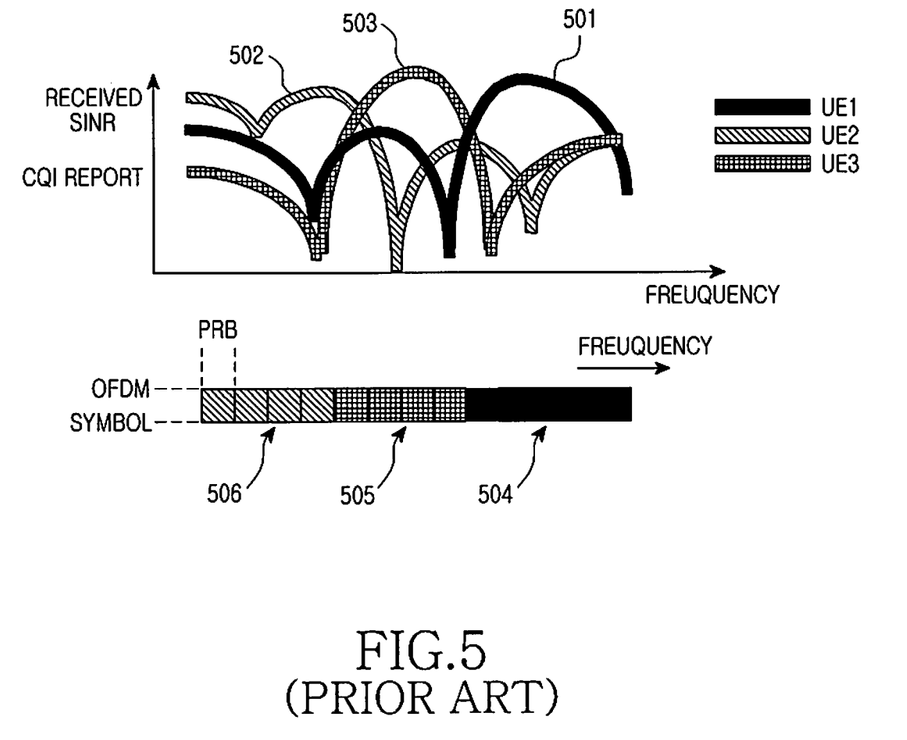
FIG. 5 is a diagram illustrative of scheduling data packet transmissions in an OFDMA communication system based on feedback of channel quality indicators from user equipments.

The Node B scheduler can select the PRBs used to transmit the data packet to a scheduled UE based on the CQI feedback from the scheduled UE over a set of PRBs. The CQI feedback is typically a Signal-to-Interference and Noise Ratio (SINR) estimate over a set of PRBs as illustrated in FIG. 5. The Node B scheduler can use this information to schedule PDSCH transmissions to UEs in the PRBs where the SINR is the highest, thereby maximizing the system throughput. In FIG. 5, the SINR 501 of UE1, the SINR 502 of UE2 and the SINR 503 of UE3 are maximized respectively over the PRB sets 504, 506, and 505 and the corresponding PDSCH transmissions can be over these PRB sets.

If the set of PRBs is a set corresponding to the entire operating BW, a RS for the respective Node B transmission antenna port is needed over the operating BW to obtain the CQI estimate and, as previously mentioned, requires the use of a CRS. For the sub-frame structure and the RS structure in FIG. 1, the total RS overhead from four Node B transmission antennas is equal to 14.3% of the total overhead, which is significant but not unacceptably large.

The maximum and average supportable data rates in a communication system depend, among other factors, on the number of transmission antennas. In order to increase these data rate metrics, and thereby more effectively utilizing the BW resource, additional antennas are often required. To enable gains in system throughput and peak data rates afforded by increasing the number of transmission antennas to be realized in practice, it is essential to avoid a substantial increase in the total RS overhead as required to support signal transmission from the additional antennas. For example, for eight Node B transmission antennas, even if antennas 5-8 employed the RS structure with reduced time density as antennas 3 and 4 in FIG. 1, the total RS overhead would be 23.8% of the total overhead, which is unacceptably large.

Additionally, it is often desirable to support PDSCH transmission to UEs with different capabilities. For example, some UEs may be able to receive PDSCH transmissions from a maximum of only four Node B antennas (legacy UEs) while other UEs may be able to receive PDSCH transmissions from a maximum of eight Node B antennas (non-legacy UEs). Support for RS transmitted from eight Node B antennas should not conflict with the capability of legacy UEs to receive PDSCH transmitted from a maximum of four Node B antennas without requiring additional receiver operations.

Therefore, there is a need to avoid proportionally increasing the RS overhead as the number of Node B transmission antennas increases.

There is another need to support RS transmissions for providing reliable data scheduling at the Node B, by enabling the UEs to provide the appropriate CQI feedback, and to enable reliable signal reception at UEs as the number of Node B transmission antennas increases.

There is yet another need to support RS transmissions from a number of Node B antennas without affecting the signal processing at UE receivers capable of processing only signals transmitted from a smaller number of Node B antennas.

SUMMARY OF THE INVENTION

Accordingly, the present invention has been designed to solve at least the aforementioned problems in the prior art, and the present invention provides methods and apparatus for enabling the transmission of Reference Signals (RS) from a new subset of Node B transmission antennas in the set of Node B transmission antennas to allow the estimation of channel quality indicator metrics while controlling the associated overhead and minimizing the impact on the operation on legacy User Equipments (UEs) which utilize only the legacy subset of Node B transmission antennas from the set of Node B transmission antennas.

Further, the present invention provides methods and apparatus for the placement of the RS from the new subset of Node B transmission antennas.

The present invention also provides methods and apparatus for the Node B, legacy UEs, and non-legacy UEs, to address the resource collisions between RS transmissions from the new subset of Node B transmission antennas and transmissions of information signals.

Additionally, the present invention provides methods and apparatus for the Node B to multiplex RS transmissions from the new subset of Node B transmission antennas in a transmission time interval for the purpose of channel quality indicator estimation.

Additionally, the present invention provides methods and apparatus for the Node B to multiplex RS transmissions from the new subset of Node B transmission antennas in a transmission time interval for the purpose of information data signal demodulation.

Finally, the present invention also provides methods and apparatus for the Node B to multiplex RS transmissions from the new subset of Node B transmission antennas for the purpose of channel quality indicator estimation over multiple transmission time intervals and to determine which transmission time intervals have RS transmissions from the new subset of Node B transmission antennas.

In accordance with an embodiment of the present invention, the RS transmissions from the new subset of Node B transmission antennas are located only in the region of the transmission time interval where data information signals are transmitted, unlike RS transmissions from the legacy subset of Node B transmission antennas which are additionally located in the region of the transmission time interval where control information signals are transmitted. Moreover, the present invention considers that legacy UEs treat RS transmissions from the new subset of Node B transmission antennas as data information signals while non-legacy UEs puncture the respective resources from the reception of data information signals.

In accordance with another embodiment of the present invention, RS transmissions from the new subset of Node B transmission antennas is code division multiplexed in the time domain and in the frequency domain while RS transmissions from the legacy subset of Node B transmission antennas uses time division multiplexing and frequency division multiplexing.

In accordance with another embodiment of the present invention, RS transmissions from the new subset of Node B transmission antennas for the purpose of channel quality indicator estimation can be periodic in non-consecutive transmission time intervals. The starting transmission time interval, in a set of transmission time intervals, can be determined by the identity of the cell served by the Node B and the transmission period can be signaled by the Node B through a broadcast channel.

In accordance with another embodiment of the present invention, RS transmissions from the new subset of Node B transmission antennas for the purpose of information signal demodulation can be transmitted over only a portion of the operating bandwidth while RS transmissions from the legacy subset of Node B transmission antennas is substantially transmitted over the entire operating bandwidth.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF THE PREFERRED EMBODIMENTS

The present invention will now be described more fully hereinafter with reference to the accompanying drawings. This invention may, however, be embodied in many different forms and should not be construed as limited to the embodiments set forth herein. Rather, these embodiments are provided so that this disclosure will be thorough and complete and will fully convey the scope of the invention to those skilled in the art.

Additionally, although the present invention is described in relation to a Single-Carrier Frequency Division Multiple Access (SC-FDMA) communication system, the present invention also applies to all Frequency Division Multiplexing (FDM) systems in general and to Orthogonal Frequency Division Multiple Access (OFDMA), OFDM, FDMA, Discrete Fourier Transform (DFT)-spread OFDM, DFT-spread OFDMA, Single-Carrier OFDMA (SCOFDMA), and SC-OFDM in particular.

System and methods of the embodiments of the present invention are related to the need for the Node B to transmit Reference Signals (RS) to enable User Equipments (UEs) to demodulate information signals and estimate a Channel Quality Indicator (CQI) metric which is then fed back to the Node B to enable channel-dependent scheduling for the transmission of information signals. Supporting the transmission of information signals from a number of Node B transmission antennas beyond the one existing in legacy communication systems, requires RS transmissions from the additional Node B antennas. However, this should minimize the associated overhead, the impact to legacy UEs, while enabling additional transmission features.

The first object of the present invention aims to provide methods and means for introducing transmission of RS from multiple Node B antennas while providing the desired reliability for the associated RS functionalities without proportionally increasing the total RS overhead.

The second object of the present invention assumes in its exemplary embodiment that the RS transmission structure from a maximum of four Node B antennas, for example as described in FIG. 1, is an existing (legacy) transmission structure and aims to provide methods and means for introducing RS transmission from additional Node B antennas while maintaining the capability of legacy UEs supporting the reception of signals transmitted from a maximum of four Node B antennas to receive such signals. The goal is for the insertion of additional RS to be transparent to such legacy UEs.

Figure 6:
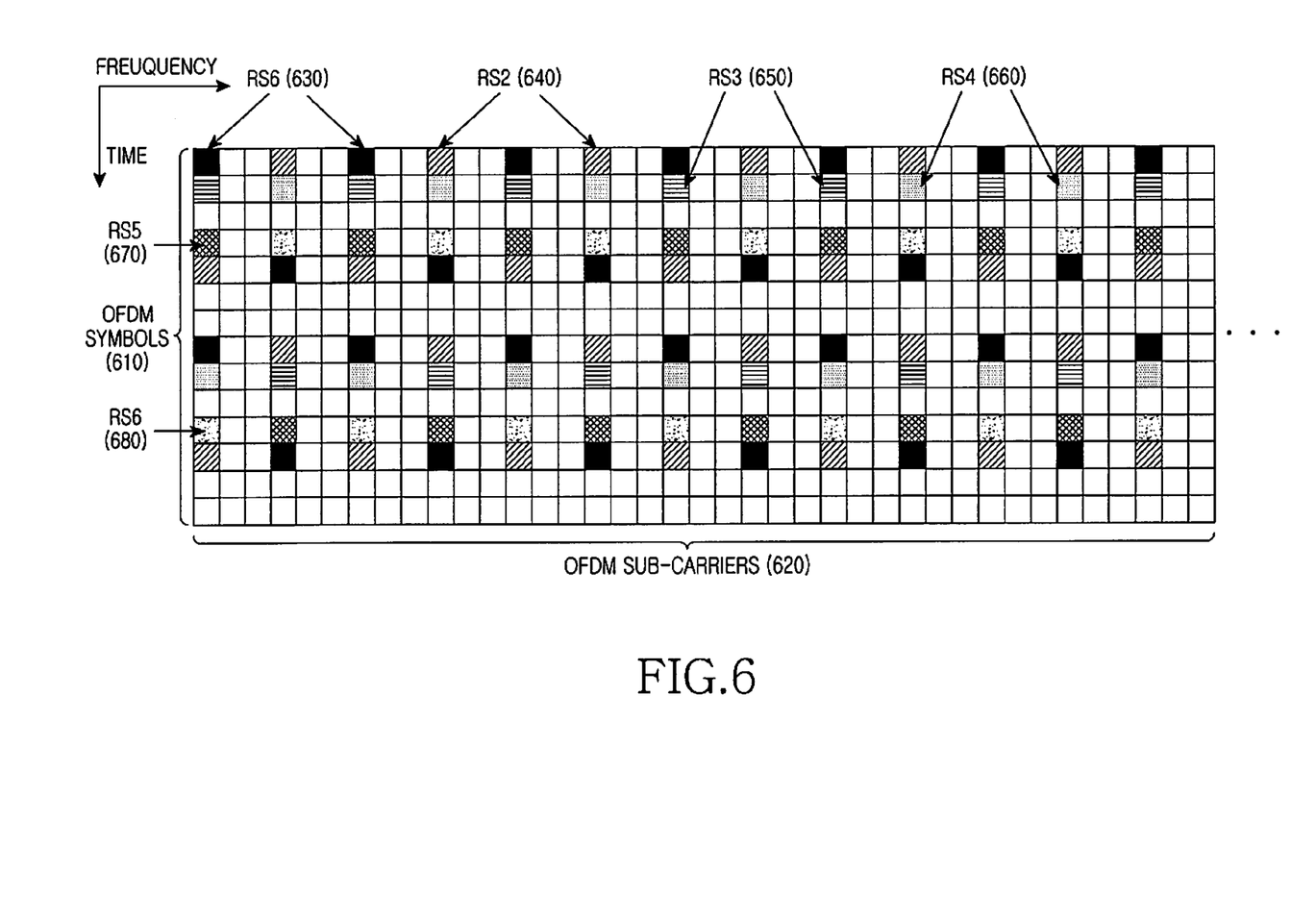
FIG. 6 is a diagram illustrating the incorporation of new reference signals, for the estimation of channel quality indicators, in a legacy sub-frame structure through frequency division multiplexing.

FIG. 6 illustrates the introduction of reference signals RS5 670 and RS6 680 transmitted from Node B antennas 5 and 6, respectively, which represent the only modification relative to FIG. 1 in the RS transmission structure in a sub-frame. The additional overhead introduced by RS5 and RS6 is 4.76% of the available overhead bringing the total RS overhead to about 19% of the available overhead. Assuming that the PDCCH 690 is transmitted at most in the first N OFDM symbols and that the system should support legacy UEs configured to receive signal transmission from at most four Node B antennas, RS5 and RS6 should not exist in the PDCCH region (first N OFDM symbols) because this may require the PDCCH to extend to the first N+1 OFDM symbols in order to maintain the same capabilities for control signaling. Then, legacy UEs may not be able to successfully receive the PDCCH. Additionally, puncturing sub-carriers where the PDCCH is transmitted in order to insert additional RS may cause significant degradation in the PDCCH reception reliability. Unlike the PDSCH 695, the PDCCH does not typically benefit from the application of Hybrid Automatic Repeat reQuest (HARQ) and requires better reception reliability than the PDSCH.

The present invention takes into consideration that RS from additional Node B antennas, beyond the ones supported for legacy UEs, are always placed outside the PDCCH region. Note however that PDCCH transmission from all Node B antennas may still apply for UEs supporting reception of signals transmitted from all Node B antennas.

Figure 7:
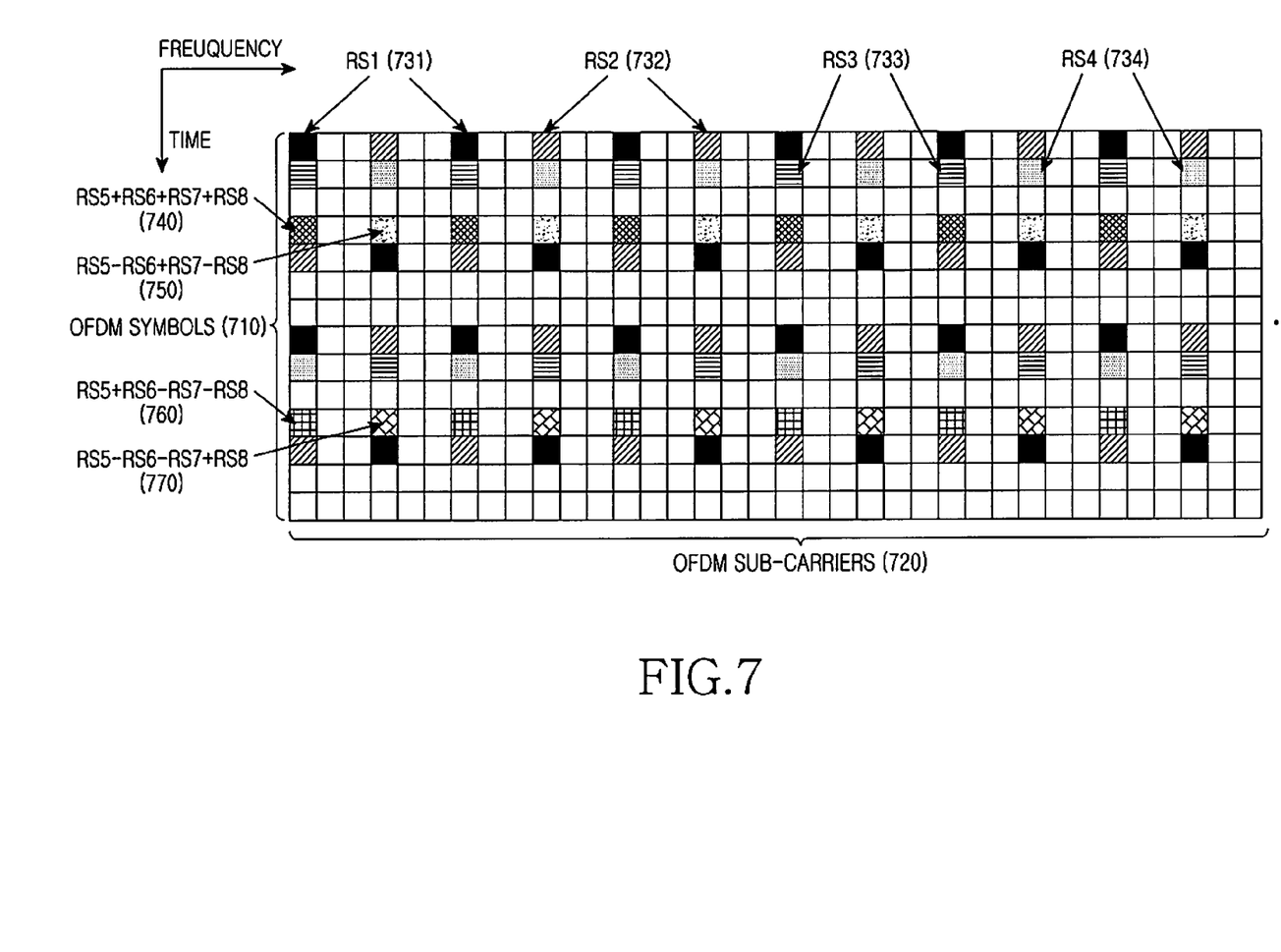
FIG. 7 is a diagram illustrating the incorporation of new reference signals, for the estimation of channel quality indicators, in a legacy sub-frame structure through code division multiplexing in the time domain and in the frequency domain.

Continuing from FIG. 6, FIG. 7 illustrates the introduction of reference signals RS7 760 and RS8 770 which are transmitted from Node B antenna ports 7 and 8, respectively, in addition to the RS1 731, RS2 732, RS3 733, RS4 734, RS5+RS6+RS7+RS8 740, and RS5−RS6+RS7−RS8 750 which are respectively transmitted from Node B antennas 1 through 6. Unlike the RS from the four Node B transmission antennas which are orthogonally multiplexed either by occupying different sub-carriers 720 (Frequency Division Multiplexing (FDM)) or different OFDM symbols 710 (Time Division Multiplexing (TDM)), or both, RS5, RS6, RS7, and RS8 are multiplexed in the same sub-carriers and the same OFDM symbols through Code Division Multiplexing (CDM). With CDM, Walsh-Hadamard (WH) codes apply to the RS in two consecutive OFDM symbols and in two consecutive sub-carriers having RS transmission. The WH codes are:

RS5: $\{1, 1\}$ in the time domain and $\{1, 1\}$ in the frequency domain;

RS6: $\{1, 1\}$ in the time domain and $\{1, -1\}$ in the frequency domain;

RS7: $\{1, -1\}$ in the time domain and $\{1, 1\}$ in the frequency domain; and

RS8: $\{1, -1\}$ in the time domain and $\{1, -1\}$ in the frequency domain.

At the UE receiver, the reverse operations are performed to remove the covering of WH codes. For example, if the $\{1, 1\}$ WH code is applied at the Node B transmitter, the UE receiver needs to sum (average) the RS from two consecutive locations in time or frequency while if the $\{1, -1\}$ WH code is applied at the Node B transmitter, the UE receiver needs to sum (average) the RS from two consecutive locations in time or frequency after having reversed the sign of the RS value in the second location. A requirement for successfully applying CDM is that the response of the channel medium remains practically the same within two consecutive locations (in time or frequency) so that orthogonality is maintained in the received signal.

$S_{11}$ and $S_{12}$ denote the received signal on odd and even RS sub-carriers, respectively, in the first OFDM symbol with RS transmission, and $S_{21}$ and $S_{22}$ denote the received signal on odd and even RS sub-carriers, respectively, in the second OFDM symbol with RS transmission. Ignoring normalization factors, the respective channel estimates for the signals transmitted Node B antennas 5 through 8 in each OFDM symbol at sub-carriers at or between odd and even RS sub-carriers could be obtained as:

Channel Estimate for Antenna 5: $S_{11}+S_{12}+S_{21}+S_{22}$;
Channel Estimate for Antenna 6: $S_{11}-S_{12}+S_{21}-S_{22}$;
Channel Estimate for Antenna 7: $S_{11}+S_{12}-S_{21}-S_{22}$; and
Channel Estimate for Antenna 8: $S_{11}-S_{12}-S_{21}+S_{22}$.

Other averaging methods preserving and restoring orthogonality may also apply. For example, the channel estimate at an even RS sub-carrier may incorporate both odd RS sub-carriers at each side of the even RS sub-carrier and vice versa.

With the use of CDM to transmit the RS from Node B antennas 5 through 8 in FIG. 7, the respective received RS SINR is decreased by a factor of 2 relative to the SINR obtained for the RS transmitted from Node B antennas 3 and 4, and by a factor of 4 relative to the SINR obtained for the RS transmitted from Node B antennas 1 and 2, assuming the same transmission power for all RS. This is because for the RS from Node B antennas 5 through 8, four RS share the same sub-carrier while the RS from Node B antennas 3 and 4 has no such sharing and the RS from Node B antennas 1 and 2 is transmitted in twice as many sub-carriers. This SINR reduction may be less than the previous factors if RS in different cells of a communication system do not always occupy the same sub-carriers.

The reduction in the received SINR for the RS from Node B antennas 5 through 8 is offset by the savings in time-frequency resources. Typically, PDSCH transmission using all eight Node B antennas is targeted to relatively high SINR UEs with low velocities for which channel estimation is highly accurate and a small loss in RS SINR does not lead to noticeably degraded PDSCH reception reliability. Additionally, legacy UEs capable of supporting reception of signals transmitted from a maximum of four Node B antennas are not affected by the transmission of RS from Node B antennas 5 through 8. The legacy UEs can assume PDSCH transmission in the sub-carriers where the RS from Node B antennas 5 through 8 are actually transmitted with the only ramification being a small degradation in the PDSCH reception reliability which the Node B scheduler can consider in advance when selecting the modulation and coding scheme. Moreover, as PDSCH benefits from HARQ, the overall impact on system throughput is negligible while no change in the receiver processing is needed for the legacy UEs.

Consequently, the RS transmission structure in FIG. 7 can support eight Node B antennas with a total overhead of about 19% without affecting the functionality of legacy UE receivers which are assumed to be configured for receiving signals transmitted from at most the four Node B antennas.

The RS transmission from Node B antennas 5 through 8 in FIG. 7 spanned the entire operating BW. This is typically appropriate when the RS is a Common RS (CRS) that can be received from all UEs. The second object of the invention considers that Node B antennas 5 through 8 transmit a mixture of CRS and UE-Dedicated RS (DRS). As it is subsequently analyzed, this can provide another mechanism for controlling the respective RS overhead.

Figure 8:
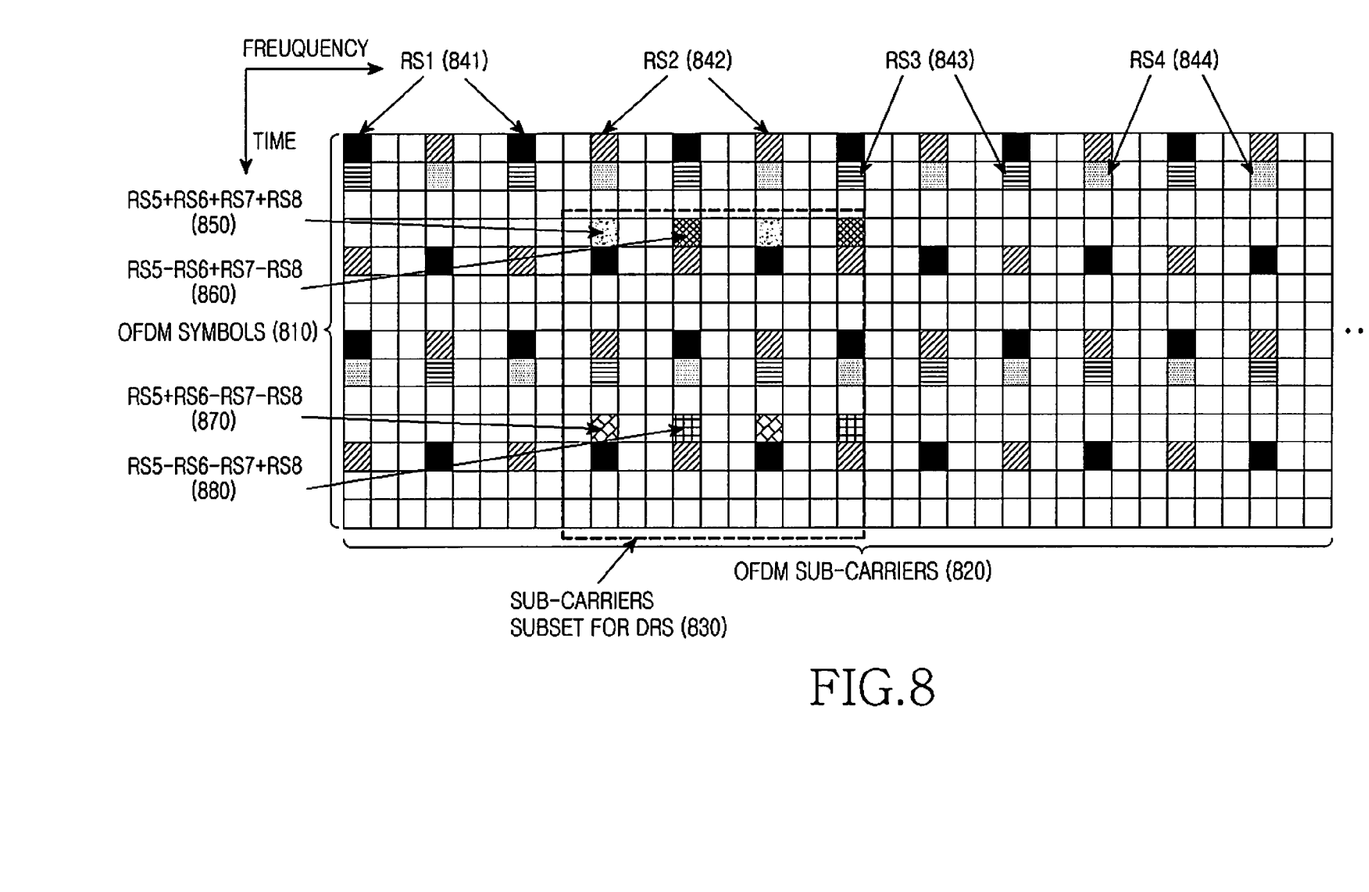
FIG. 8 is a diagram illustrating the incorporation of new reference signals, for the estimation of the channel medium and the demodulation of data information signals, in a legacy sub-frame structure through code division multiplexing in the time domain and in the frequency domain.

FIG. 8 illustrates the concept of DRS from Node B antennas 5 through 8 (this can obviously be extended to DRS from Node B antennas 1 through 4). A reference UE capable of receiving a signal transmitted from all eight Node B antennas is scheduled to receive PDSCH in the sub-set 830 of sub-carriers 820 during the portion of OFDM symbols 810 allocated to PDSCH transmission in a sub-frame. The CRS from Node B antennas 1 through 4, namely RS1 841, RS2 842, RS3 843, and RS4 844, remain unchanged. The RS from Node B antennas 5 through 8, namely RS5, RS6, RS7, and RS8, are multiplexed in the same sub-carriers and OFDM symbols through CDM as described in FIG. 7. In particular, in the odd sub-carriers of the first OFDM symbol having RS transmission from Node B antennas 5 through 8, RS5+RS6+RS7+RS8 850 is transmitted while in the even sub-carriers, RS5−RS6+RS7−RS8 860 is transmitted. In the odd sub-carriers of the second OFDM symbol having RS transmission from Node B antennas 5 through 8, RS5+RS6-RS7-RS8 870 is transmitted while in the even sub-carriers, RS5−RS6−RS7+RS8 880 is transmitted. Compared to FIG. 7, the additional RS overhead from Node B antennas 5 through 8 in FIG. 8 is smaller and the PDSCH reception from legacy UEs remains entirely unaffected.

Figure 9:
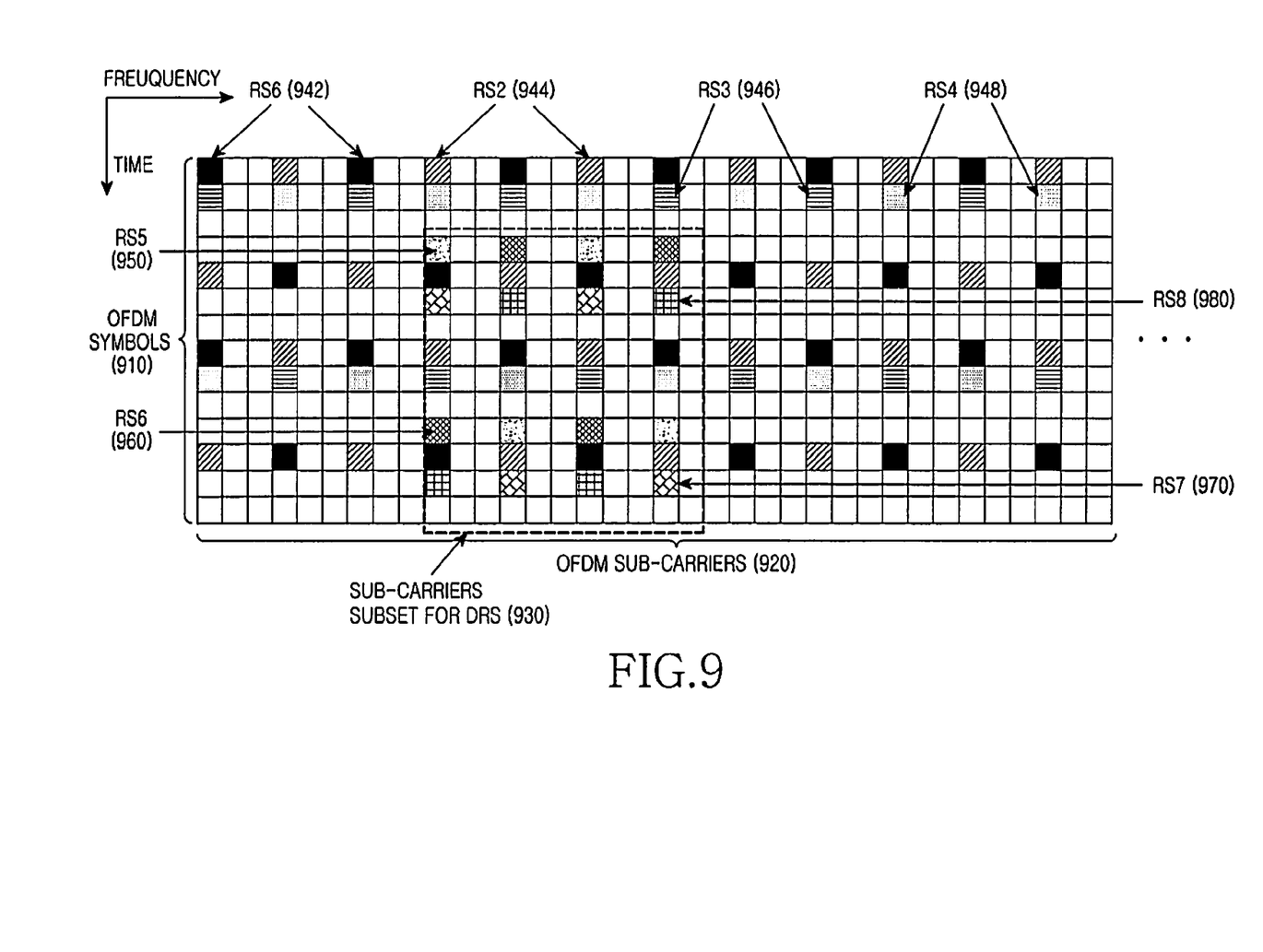
FIG. 9 is a diagram illustrating the incorporation of new reference signals, for the estimation of the channel medium and the demodulation of data information signals, in a legacy sub-frame structure through code division multiplexing in the time domain and in the frequency domain.

An alternative structure for the DRS transmission from Node B antennas 5 through 8 is illustrated in FIG. 9. The same structure applies for the DRS from Node B antennas 1 through 4 (not shown for brevity). The respective DRS overhead is doubled relative to the DRS overhead in FIG. 8 but there is no constraint for the channel medium response to effectively remain the same between consecutive sub-carriers or OFDM symbols with RS transmission as required for the successful application of CDM. Similarly to FIG. 8, a reference UE capable of receiving a signal transmitted from all eight Node B antennas is scheduled to receive PDSCH in the sub-set 930 of sub-carriers 920 during the portion of OFDM symbols 910 allocated to PDSCH transmission in a sub-frame. The CRS from Node B antennas 1 through 4, namely RS1 941, RS2 942, RS3 943, and RS4 944, remain unchanged. The RS from Node B antennas 5 through 8, namely RS5 950, RS6 960, RS7 970, and RS8 980, are multiplexed in different sub-carriers or different OFDM symbols using FDM/TDM.

It should be noted that although in all the described RS structures the separation of sub-carriers and OFDM symbols with RS transmission from Node B antennas 5 through 8 are shown to be the same as the ones for the RS transmission from Node B antennas 1 through 4, this is only an exemplary embodiment. The separation of RS sub-carriers and OFDM symbols with RS transmission can generally be different between Node B antennas 5 through 8 and Node B antennas 1 through 4. It is also possible for the RS structure from Node B antennas 5 through 8 to be configurable. For example, in channels with small frequency selectivity, CDM may apply as in FIG. 7 or FIG. 8, while in channels with large frequency selectivity, FDM/TDM may apply as in FIG. 6 or FIG. 9. The multiplexing method may be blindly determined by the UEs having a reception capability of signals transmitted from eight Node B antennas or it can be signaled using 1 bit in a broadcast channel from the serving Node B.

Although having a DRS transmitted from Node B antennas 5 through 8 is sufficient for PDSCH reception by a UE, this cannot apply for PDCCH transmission which typically needs to be frequency diverse and not located only in a sub-set of contiguous sub-carriers, and cannot apply for CQI estimation enabling scheduling from Node B antennas 5 through 8. To address the first issue, an embodiment of the invention considers that a Node B having eight antennas uses only four of these antennas for PDCCH transmission (for example, by combining pairs from eight antennas) while the Node B can use all eight antennas for PDSCH transmission.

To address the second issue, another embodiment of the present invention considers that a CRS is also transmitted from Node B antennas 5 through 8 to at least enable UEs to obtain a CQI estimate from antennas 5 through 8. This CQI estimate can then be provided by UEs to the serving Node B through the uplink communication channel in order for the Node B to perform scheduling of PDSCH transmissions to UEs from Node B antennas 5 through 8 using the appropriate parameters, such as the set of sub-carriers and the modulation and coding scheme, for each scheduled UE. As this CRS transmitted from Node B antennas 5 through 8 is intended to primarily serve for CQI estimation, and not for channel estimation to perform PDSCH demodulation in each sub-frame, the CRS does not need to be transmitted in every sub-frame, thereby avoiding significantly increasing the total RS overhead. Considering that PDSCH transmissions from Node B antennas 5 through 8 are primarily intended for UEs with low or medium velocities, the CQI variations in time are slow and the CRS transmission from Node B antennas 5 through 8 does not need to be frequent. Naturally, in sub-frames where CRS from Node B antennas 5 through 8 is transmitted, it can also be used in PDSCH reception and possibly in the reception of control channels if a method involving all Node B transmission antennas in the respective sub-frames is used for their transmission.

Figure 10:
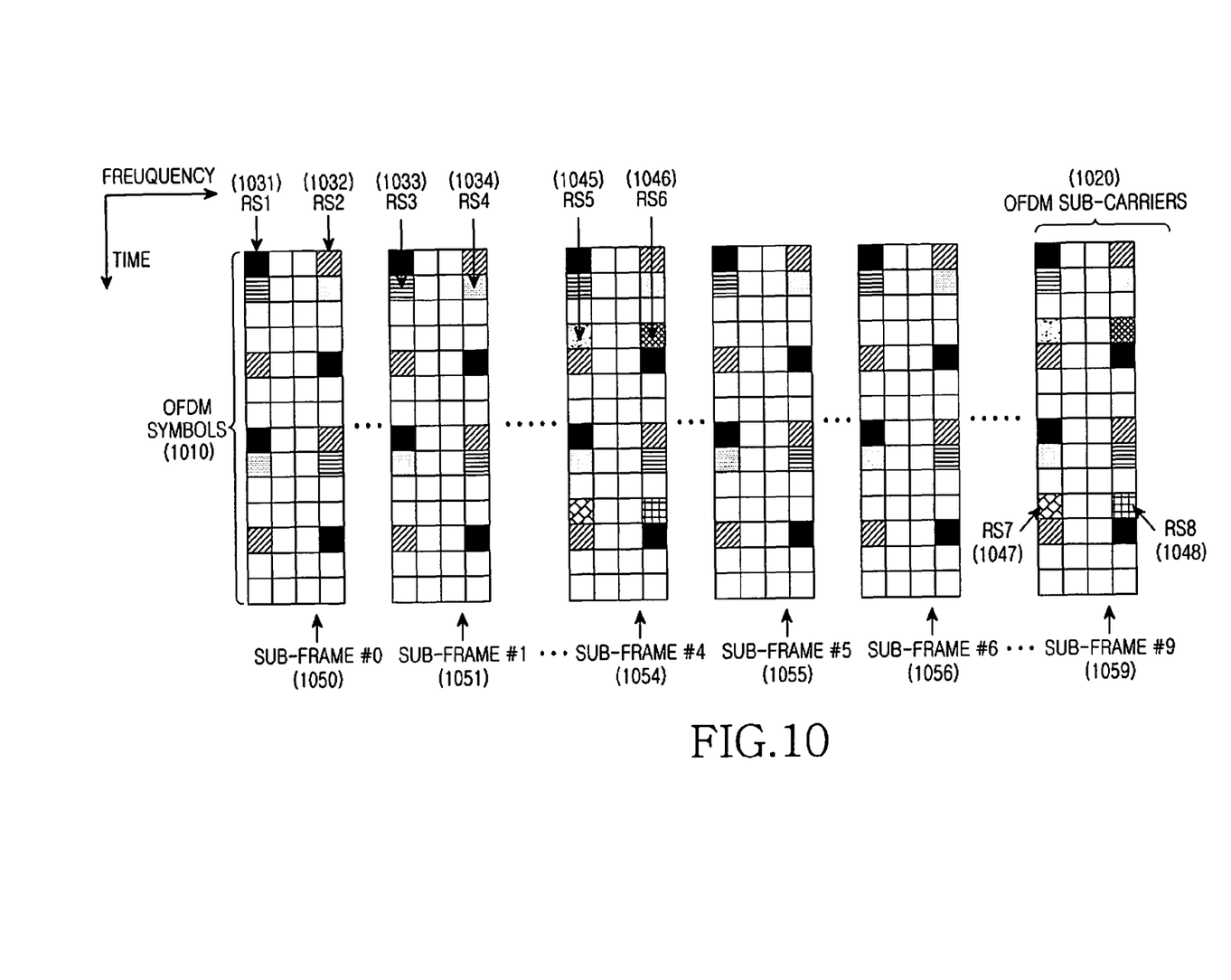
FIG. 10 is a diagram illustrative of the periodic transmission of new reference signals, for the estimation of channel quality indicators, in an existing sub-frame structure.

FIG. 10 further illustrates an exemplary CRS transmission from Node B antennas 5 through 8. This CRS transmission is assumed to be once every 5 sub-frames. The sub-frame structure consists of OFDM symbols 1010 in the time domain and sub-carriers 1020 in the frequency domain as it was previously described. The CRS from Node B antennas 1 through 4, namely RS1 1031, RS2 1032, RS3 1033, and RS4 1034, is transmitted in all sub-frames. The CRS from Node B antennas 5 through 8, namely RS5 1045, RS6 1046, RS7 1047, and RS8 1048, are transmitted only in sub-frame 4 1054 and sub-frame 9 1059. DRS transmission from Node B antennas 5 through 8 is not shown for simplicity.

To minimize the CRS overhead from Node B antennas 5 through 8, an exemplary embodiment of the invention considers that each of these CRS is transmitted in only one OFDM symbol. Otherwise, the same structure with the CRS from Node B antennas 1 through 4 is maintained to allow for similar processing at a UE receiver. Nevertheless, the CRS from each of the Node B antennas 5 through 8 may be transmitted in two OFDM symbols or CDM can be used for the transmission of RS5, RS6, RS7, and RS8 as described in FIG. 7. Moreover, the CRS from all Node B antennas 5 through 8 are transmitted in one sub-frame to enable UEs to monitor only the respective sub-frames, thereby enabling UE power savings, or assist in the reception of specific control channels transmitted in such sub-frame.

The sub-frames having CRS transmission from Node B antennas 5 through 8 can be either pre-determined or signaled by the serving Node B using a broadcast channel. In the former case, CRS transmission can be pre-determined, for example, that every fifth sub-frame contains CRS transmission from Node B antenna ports 5 through 8 (at predetermined time-frequency locations). The exact sub-frames with CRS transmission from Node B antennas 5 through 8 may also be pre-determined, such as sub-frame 0 and sub-frame 4, or may simply have a predetermined offset with the first sub-frame depending on the cell identity (Cell-ID). For example, for a first Cell-ID the first sub-frame is sub-frame 0 while for a second Cell-ID the first sub-frame is sub-frame 3. This further assumes that UEs obtain the Cell-ID after initial synchronization with their serving cell.

With broadcast signaling of the sub-frames where the Node B transmits the CRS from antennas 5 through 8, several such configurations can be supported, for example, depending on the system load. If the cell primarily serves legacy UEs supporting RS transmission from only Node B antennas 1 through 4, no sub-frames may contain CRS transmission from Node B antennas 5 through 8. If the cell primarily serves UEs supporting RS transmission from all eight Node B antennas, all sub-frames may contain CRS transmission from Node B antennas 5 through 8. Naturally, intermediate configurations can also be supported. Table 1 outlines possible configurations of sub-frames with CRS transmission from Node B antennas 5 through 8 assuming that 3 bits are included in a broadcast channel to specify the configuration.

TABLE 1

Broadcasted 3-bit Field Specifying Sub-Frames with CRS Transmission from Antennas 5 through 8.

| Broadcasted Value | Sub-Frame Configuration with CRS Transmission from Antennas 5 through 8 |
|---|---|
| 000 | No sub-frame |
| 001 | One every 60 sub-frames |
| 010 | One every 20 sub-frames |
| 011 | One every 10 sub-frames |
| 100 | One every 5 sub-frames |
| 101 | One every 3 sub-frames |
| 110 | One every 2 sub-frames |
| 111 | All sub-frames |

The starting sub-frame may always be the same, for example, the first sub-frame every 60 sub-frames, or may depend on the Cell-ID as previously described. As legacy UEs may not be able to interpret the broadcasted field specifying the sub-frames with CRS transmission from Node B antennas 5 through 8, this field may be in a broadcast channel that is received only by UEs capable of receiving this CRS transmission.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for transmitting first and second sets of Reference Signals (RSs) from a set of Node B antennas, the set of Node B antennas also transmitting control data signals in a Physical Downlink Control Channel (PDCCH) and information data signals in a Physical Downlink Shared Channel (PDSCH) over a transmission time interval having transmission symbols, the PDCCH being located in different transmission symbols than the PDSCH, the method comprising:
   transmitting the first set of RSs, from the set of Node B antennas, using frequency division multiplexing and time division multiplexing, in both PDCCH transmission symbols and PDSCH transmission symbols of consecutive transmission time intervals; and
   periodically transmitting the second set of RSs, from the set of Node B antennas, using code division multiplexing in a time domain and in a frequency domain, in PDSCH transmission symbols of the transmission time interval,
   wherein a transmission period is received from the Node B.

2. The method of claim 1, wherein the first set of RSs is used for demodulation of the control data signals or for demodulation of the information data signals and for obtaining channel quality estimates, and the second set of RSs is used for obtaining the channel quality estimates.

3. The method claim 1, wherein the second set of RSs is used for obtaining a channel quality estimate.

4. The method of claim 1, further comprising:
   transmitting the first set of RSs from the set of Node B antennas over an entire operating bandwidth; and
   transmitting the second set of RSs from the set of Node B antennas over a portion of the operating bandwidth that is less than the entire operating bandwidth.

5. A method for transmitting first and second sets of Reference Signals (RSs) from a set of Node B antennas, over a transmission time interval in a set of transmission time intervals and over an entire operating bandwidth in a cell, the method comprising:
   transmitting the first set of RSs from the set of Node B antennas in all sub-frames in consecutive transmisson time intervals using frequency division multiplexing and time division multiplexing; and
   periodically transmitting the second set of RSs from the set of Node B antennas in one sub-frame among a set of sub-frames in transmission time intervals using code division multiplexing in a time domain and in a frequency domain, a number of the sub-frames in the set being greater than 1,
   wherein a sub-frame comprises a plurality of symbols, and
   wherein a transmission period is received from the Node B.

6. The method of claim 5, wherein the second set of RSs is used for obtaining a channel quality estimate.

7. The method of claim 5, wherein the one sub-frame in the set of sub-frames for the second set of RSs is determined from a cell identity.

8. The method of claim 5, wherein the Node B communicates with a first category and a second category of User Equipments (UEs) and the second category of UEs interprets the broadcast signaling from the Node B.

9. The method of claim 5 wherein the second set of RSs is used for obtaining channel quality estimates.

10. The method of claim 5, further comprising:
    combining at the Node B the first set of RSs or the second set of RSs for demodulation of information control signals; and
    transmitting the first set of RSs and the second set or RSs separately for demodulation of information data signals.

11. The method of claim 10, wherein a number of RSs used for the demodulation of the information data signals is eight, and a number of RSs used for the demodulation of the information control signals is four.

12. The method of claim 5, wherein the number of the sub-frames in the set is transmitted to a user equipment.

13. An apparatus for transmitting first and second sets of Reference Signals (RSs) from a set of Node B antennas, the set of Node B antennas also transmitting control data signals in a Physical Downlink Control CHannel (PDCCH) and information data signals in a Physical Downlink Shared CHannel (PDSCH) over a transmission time interval having transmission symbols, the PDCCH being located in different transmission symbols than the PDSCH, the apparatus comprising:
    a first transmitter for transmitting the first set of RSs, from the set of Node B antennas, using frequency division multiplexing and time division multiplexing, in both PDCCH transmission symbols and PDSCH transmission symbols of consecutive transmission time intervals; and
    a second transmitter for periodically transmitting the second set of RSs, from the set of Node B antennas, using code division multiplexing in a time domain and in a frequency domain, in PDSCH transmission symbols of the transmission time interval,
    wherein a transmission period is received from the Node B.

14. The apparatus of claim 13, wherein the first set of RSs is used for demodulation of the control data signals or for demodulation of the information data signals and for obtaining channel quality estimates, and the second set of RSs is used for obtaining the channel quality estimates.

15. An apparatus for transmitting first and second sets of Reference Signals (RSs) from a set of Node B antennas, over a transmission time interval in a set of transmission time intervals and over an entire operating bandwidth in a cell, the apparatus comprising:
    a first transmitter for transmitting the first set of RSs from the set of Node B antennas in all sub-frames in consecutive transmission time intervals using frequency division multiplexing and time division multiplexing; and
    a second transmitter for periodically transmitting the second set of RSs from the set of Node B antennas in one sub-frame among a set of sub-frames in transmission time intervals using code division multiplexing in a time domain and in a frequency domain, a number of the sub-frames in the set being greater than 1,
    wherein a sub-frame comprises a plurality of symbols, and
    wherein a transmission period is received from the Node B.

16. The apparatus of claim 15, wherein the number of the sub-frames in the set is transmitted to a user equipment.

17. The apparatus of claim 15, wherein the second set of RSs is used for obtaining a channel quality estimate.

18. The apparatus of claim 15, wherein the one sub-frame in the set of sub-frames for the second set of RSs is determined from a cell identity.

19. The apparatus of claim 15, wherein a Node B communicates with a first category and a second category of User Equipments (UEs) and the second category of UEs interprets the broadcast signaling from the Node B.

20. The apparatus of claim 15, further comprising:
  combining at a Node B the first set of RSs or the second set of RSs for demodulation of information control signals; and
  transmitting the first set of RSs and the second set of RSs separately for demodulation of information data signals.

21. The apparatus of claim 20, wherein a number of RSs used for the demodulation of the information data signals is eight, and a number of RSs used for the demodulation of the information control signals is four.

* * * * *